(12) United States Patent
Thomas et al.

(10) Patent No.: US 9,080,717 B2
(45) Date of Patent: Jul. 14, 2015

(54) DEVICE FOR THE TRANSLATIONAL GUIDANCE OF A LOAD AND METHOD OF CREATING SUCH A DEVICE

(75) Inventors: Patrick Thomas, Fay aux Loges (FR); Serge Maneuf, Amilly (FR); Pascal Boitiaux, Migneres (FR)

(73) Assignee: Micro-Controle-Spectra Physics, Evry (FR)

( * ) Notice: Subject to any disclaimer, the term of this patent is extended or adjusted under 35 U.S.C. 154(b) by 0 days.

(21) Appl. No.: 14/131,237

(22) PCT Filed: Jul. 2, 2012

(86) PCT No.: PCT/FR2012/051521
§ 371 (c)(1),
(2), (4) Date: Jan. 22, 2014

(87) PCT Pub. No.: WO2013/007914
PCT Pub. Date: Jan. 17, 2013

(65) Prior Publication Data
US 2014/0137776 A1    May 22, 2014

(30) Foreign Application Priority Data
Jul. 12, 2011    (FR) .................................... 11 56341

(51) Int. Cl.
*F16C 29/00*    (2006.01)
*F16M 11/04*    (2006.01)
*F16C 29/04*    (2006.01)
*F16C 29/12*    (2006.01)
*F16C 29/02*    (2006.01)

(52) U.S. Cl.
CPC .............. *F16M 11/043* (2013.01); *F16C 29/02* (2013.01); *F16C 29/04* (2013.01); *F16C 29/123* (2013.01); *Y10T 29/49826* (2015.01)

(58) Field of Classification Search
CPC ..... F16C 29/002; F16C 29/063; F16C 29/123
USPC .................................... 384/10, 26, 37, 49, 50
See application file for complete search history.

(56) References Cited

U.S. PATENT DOCUMENTS 5,201,584 A     4/1993  Simons
8,613,549 B2 *  12/2013 Pfeiffer .......................... 384/10

FOREIGN PATENT DOCUMENTS

DE          4323670      1/1995
WO    WO 2009071502 A1 *  6/2009

* cited by examiner

*Primary Examiner* — Phillip A Johnson
(74) *Attorney, Agent, or Firm* — Duane Morris LLP; J. Rodman Steele, Jr.; Gregory M. Lefkowitz

(57) ABSTRACT

Device for the translational guidance of a load and method for creating such a device. The guide device (1) comprises an elongate bed plate (2), a mobile carriage (6) which serves to support the load, and guide means (7) that allow the carriage (6) to move longitudinally in relation to the bed plate (2), said carriage (6) comprising a bottom plate (9) which is provided with through-cuts (10) intended to give it at least some lateral elasticity, and which is mounted on the bed plate (2) under lateral stress, as well as a platform (13) which is fixed to the top face of this bottom plate (9) at fixing points (14).

9 Claims, 2 Drawing Sheets

DEVICE FOR THE TRANSLATIONAL GUIDANCE OF A LOAD AND METHOD OF CREATING SUCH A DEVICE

CROSS-REFERENCE TO RELATED APPLICATIONS

This application is a §371 national stage entry of International Application No. PCT/FR2012/051521, filed Jul. 2, 2012, which claims priority to French Patent Application No. 1156341 filed Jul. 12, 2011, the entire contents of which are incorporated herein by reference.

The present invention relates to a device for precision translational guidance of a load, and a method of creating such a device.

The present invention applies, more specifically, to a translational guidance device (as described in document U.S. Pat. No. 5,201,584, for example) of the type that comprises:
an elongate bed plate that has a horizontal base provided at its two extremities with vertical branches;
a carriage that serves as a load support and of which at least a portion is disposed under lateral stress between the branches of said bed plate; and
guidance means that are disposed at the junction between said bed plate and said carriage and which enables said carriage to move longitudinally relative to said bed plate.

The present invention is more specifically intended, although not exclusively so, for the translational guidance of optical and/or laser components, including means for data acquisition, in particular measuring means. This guidance device is preferably used for data acquisition, for which a very high degree of straightness of movement is required, for example in the medical field or the military field.

Usually, in order to produce such a guidance device, and in particular to fit a "male" portion of said carriage onto said "female" bed plate, the following operations are, generally, performed:
lateral deformation of the body of the bed plate is produced by moving its branches apart; then
said "male" portion of the carriage is placed between these branches, which are released after the male part has been positioned, the lateral stress being created following this release because of the appropriate lateral dimensions of said "male" part and said bed plate respectively. The guidance pressure is also adjusted manually via a screw.

This embodiment and in particular this fitting, both of which are conventional, of a guidance device has disadvantages, and in particular:
a negative effect (due to the deformation of the body of the bed plate) on the straightness of the guidance, which does not have the sufficient attributes required for all the applications mentioned above; and
pre-loading of the guidance (applied via the load that results from the lateral extension of the female portion) which is poorly controlled.

This conventional guidance device is therefore not completely satisfactory for all the applications that might be considered, particularly in the medical field or the military field.

The aim of the present invention is to remedy these disadvantages. The invention relates to a device for precision translational guidance of a load, with improved performance and capable of providing pre-loading of the guidance, in a predetermined manner, and without a loss of geometric quality.

To that end, according to the invention, said device of the type that comprises:
an elongate bed plate with a horizontal base (preferably provided at its two extremities with vertical branches);
a carriage that serves as a load support and of which at least a portion is disposed under lateral stress on said bed plate; and
guidance means that are disposed at the junction between said bed plate and said carriage and which enable said carriage to move longitudinally relative to said bed plate,
is distinctive in that said carriage comprises:
a bottom plate that is provided with through-cuts intended to give it at least some lateral elasticity and which is fitted under lateral stress onto said bed plate; and
a platform that is fixed to the upper face of said bottom plate at fixing points.

Thus, by virtue of the invention, and as detailed below, the fitting of the bottom plate takes into consideration the lateral elasticity produced by said through-cuts, which prevents the body of the bed plate from deforming during fitting, as happens with the conventional devices mentioned above.

In addition, according to the invention, said cuts are formed in such a way as to produce a lateral elasticity with predetermined features, as required for the intended application. The features (number, shape, thickness, etc.) of said cuts are defined empirically.

Consequently, the advantages of the present invention include the following in particular:
an absence of deformation of the body of the bed plate during fitting so that the straightness of the guidance is maintained; and
a pre-loading defined by the controlled compression of the deformable portion (bottom plate) of the carriage, which is well-controlled.

In a preferred embodiment, the horizontal base of the bed plate is provided at its two extremities with vertical branches, and the bottom plate is fitted under lateral stress between said vertical branches of the bed plate, which is preferably made in a single piece. However, the branches can also be added to the horizontal base, or elements of the guidance means (such as guide rails) can be fitted directly onto the horizontal base.

Advantageously, said bottom plate also comprises holes at the extremities of at least some of said cuts, which facilitates the work of said cuts.

In addition, advantageously, to avoid immobilising the bottom plate completely when the platform is being fixed:
said bottom plate can comprise auxiliary through-cuts at at least some of the fixing points, so as to produce some flexibility; and/or
screws (which are used for fixing) can be surrounded by an element made of a resilient material.

In a preferred embodiment, the outer faces of, respectively, the vertical branches of said bed plate, the horizontal base of said bed plate, and said bottom plate have, in transverse section, a generally rectangular shape which, by virtue of the features stated above, is not deformed during fitting.

The present invention also relates to a method for producing a translational guidance device, of the type stated above.

According to the invention, this method is distinctive in that it uses at least the following successive operations:
a) through-cuts are made in a plate described as a bottom plate in order to give it at least some lateral elasticity with predetermined features;
b) this bottom plate is fitted to the bed plate using compression made possible by said lateral elasticity in order to obtain an arrangement under lateral stress, said guidance means being provided between said bottom plate and said bed plate; and
c) a platform is fixed to the upper face of said bottom plate, said platform and said bottom plate forming said movable carriage of the guidance device.

The pre-loading of the guidance is thus applied by the load that results from compression of the deformable male portion (bottom plate).

Furthermore, advantageously, at step a), auxiliary through-cuts can also be made in said bottom plate, at fixing points (of the platform to said bottom plate).

The present invention also relates to any system for data acquisition that comprises a translational guidance device, as described above.

The appended drawings will give a clear understanding of how the invention can be produced. In these drawings, identical references designate similar elements.

Figure 1:
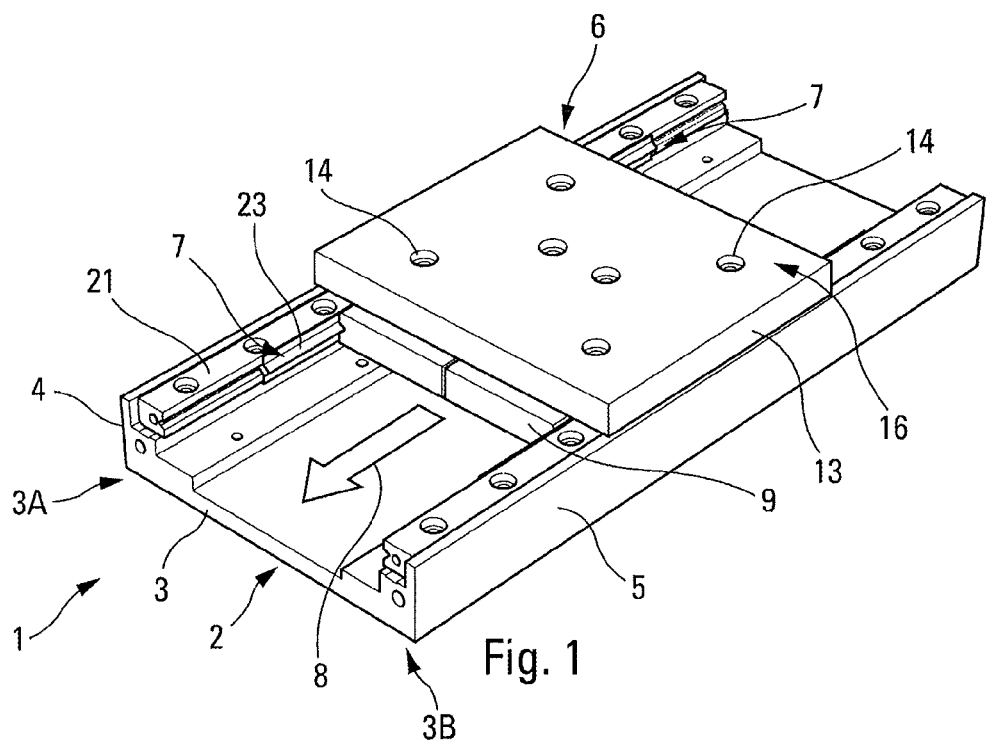
FIG. 1 is a diagrammatic perspective view of the basic elements of a guidance device according to the invention.

The device 1 according to the invention and shown diagrammatically in FIG. 1 is intended for the precision translational guidance of a load, including a means for data acquisition, in particular of an optical type. This device 1 can be used particularly in the field of imaging, in particular medical imaging, or in the military field, and, more generally, in any field where a very high degree of straightness of movement (in translation) is required.

This precision guidance device 1 is of the type comprising:
an elongate bed plate 2, preferably made of hardened steel, which has a transverse section in the general shape of a U with right-angles. This elongate bed plate 2 comprises an elongate horizontal base 3, of a generally plane shape, provided at its two lateral extremities 3A and 3B with vertical branches 4 and 5. This bed plate 2 can be placed in position and fixed to an appropriate support;
a movable carriage 6, which serves as a support for a load (not shown), in particular a data acquisition means, at least a portion of said carriage 6 being disposed under lateral stress between the branches 4 and 5 of said bed plate 2; and
conventional guidance means 7, detailed below, which are disposed at the junction between said bed plate 2 and said carriage 6 and which allow said carriage 6 to move longitudinally relative to said bed plate 2, as indicated by an arrow 8 in FIG. 1, in the direction of that arrow 8 and in the opposite direction.

These guidance means 7 form part of a guidance system (not shown) that comprises all the conventional elements necessary to produce movement of the carriage 6, and in particular motor means.

Figure 2:
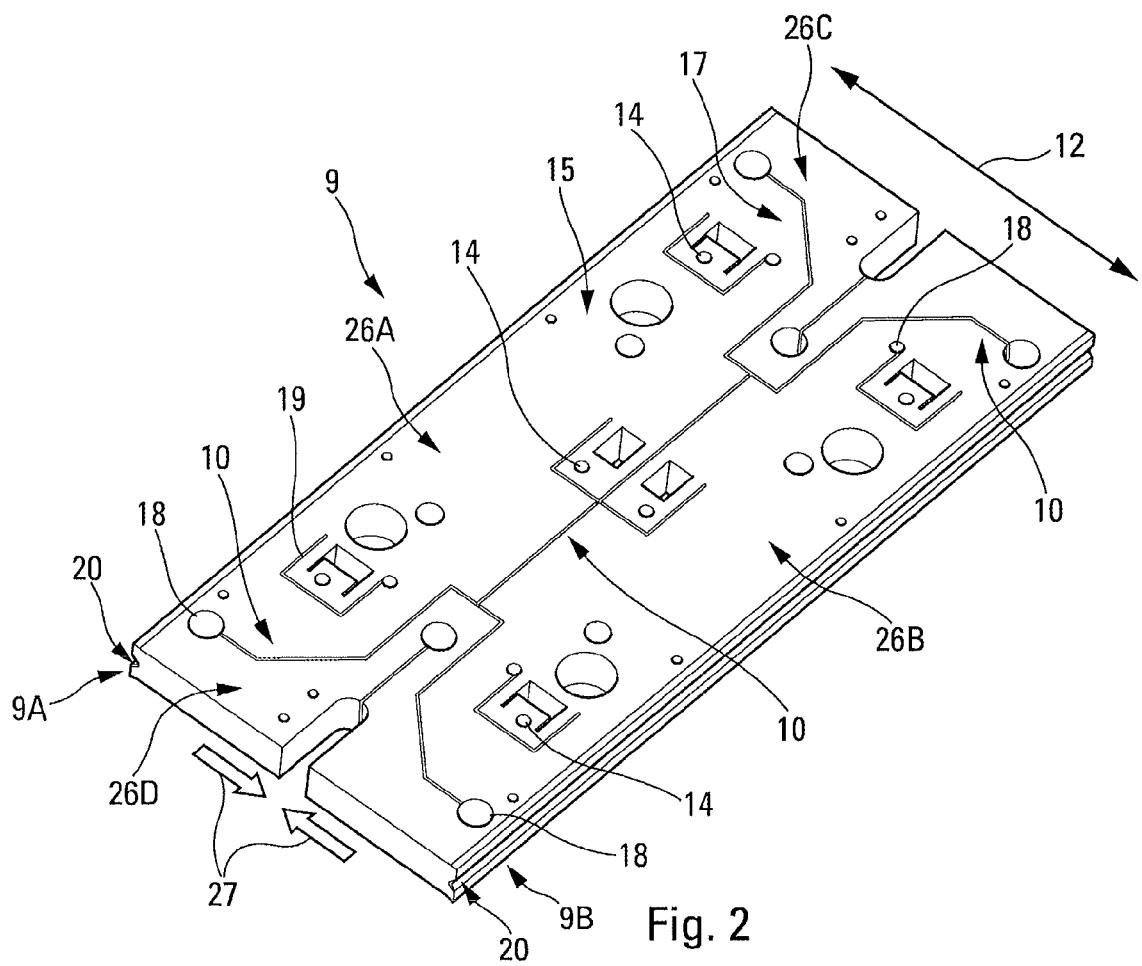
FIG. 2 is a diagrammatic perspective view of an embodiment of a bottom plate of a carriage forming part of a guidance device according to the invention.

According to the invention, said carriage 6 comprises:
a bottom plate 9, of plane form, which is provided with through-cuts 10 (i.e. cuts running through the entire thickness of the bottom plate 9) intended to give it at least some lateral elasticity, that is, elasticity in the direction perpendicular to the longitudinal direction 7 in the horizontal plane, as indicated by a double arrow 12 in FIG. 2. This bottom plate 9, preferably made of hardened steel, has dimensions appropriate for fitting under lateral stress between the branches 4 and 5 of said bed plate 2, as detailed below; and
a platform 13, also of plane form, which is fixed at fixing points or fixing zones 14, via its lower face, to the upper face 15 of said bottom plate 9. This platform 13, preferably also made of hardened steel, is intended to bear on its upper face 16, directly or via any type of conventional support, the load that has to be moved.

In addition, according to the invention, said cuts 10 are formed in such a way as to produce some lateral elasticity that has predetermined features, as required for the intended application, taking into consideration the respective widths of the bottom plate 9 and of the distance between the branches 4 and 5. The features of said cuts 10 (number, thickness, etc.), and in particular their design 17 (shown in plan) are preferably defined in an empirical manner. In order to do this, an initial design is determined theoretically, and then modified and adjusted to obtain a final design that has the required features, particularly lateral elasticity. As an illustration, FIG. 2 shows an example of a design 17 (in other words, shown in plan) of all the cuts 10, which will be detailed below.

Consequently, the device 1 according to the invention has the following advantages in particular:
the body of the bed plate 2 is not deformed during fitting, so that straightness is maintained in the guidance of the carriage 6. As an example, a guidance straightness of approximately 0.5 µm over 300 mm can be obtained; and
a pre-loading determined by the controlled compression of the deformable portion (bottom plate 9 of the carriage 6), which is well-controlled.

Said bottom plate 9 also comprises, as shown in FIG. 2, holes 18 at the extremities of at least some cuts 10, 19, which facilitate the action produced by said cuts 10, 19. The platform 13 is fixed to said bottom plate 9, preferably via screws (not shown).

In addition:
at least some of said screws can be surrounded by an element, for example a tubular element, that is made of a resilient material; and/or
the bottom plate 9 can also comprise auxiliary through-cuts 19, partially surrounding at least some of said fixing points 14, with the aim of producing some flexibility at these points.

These last features prevent the complete immobilisation of the bottom plate 9, when the platform 13 is fixed thereto.

In a preferred embodiment, the external faces of, respectively, the vertical branches 4 and 5 of said bed plate 2, the horizontal base 3 of said bed plate 2, and said bottom plate 9 have, in transverse section, a rectangular shape which, by virtue of the features stated above, is not deformed during fitting.

Figure 3:
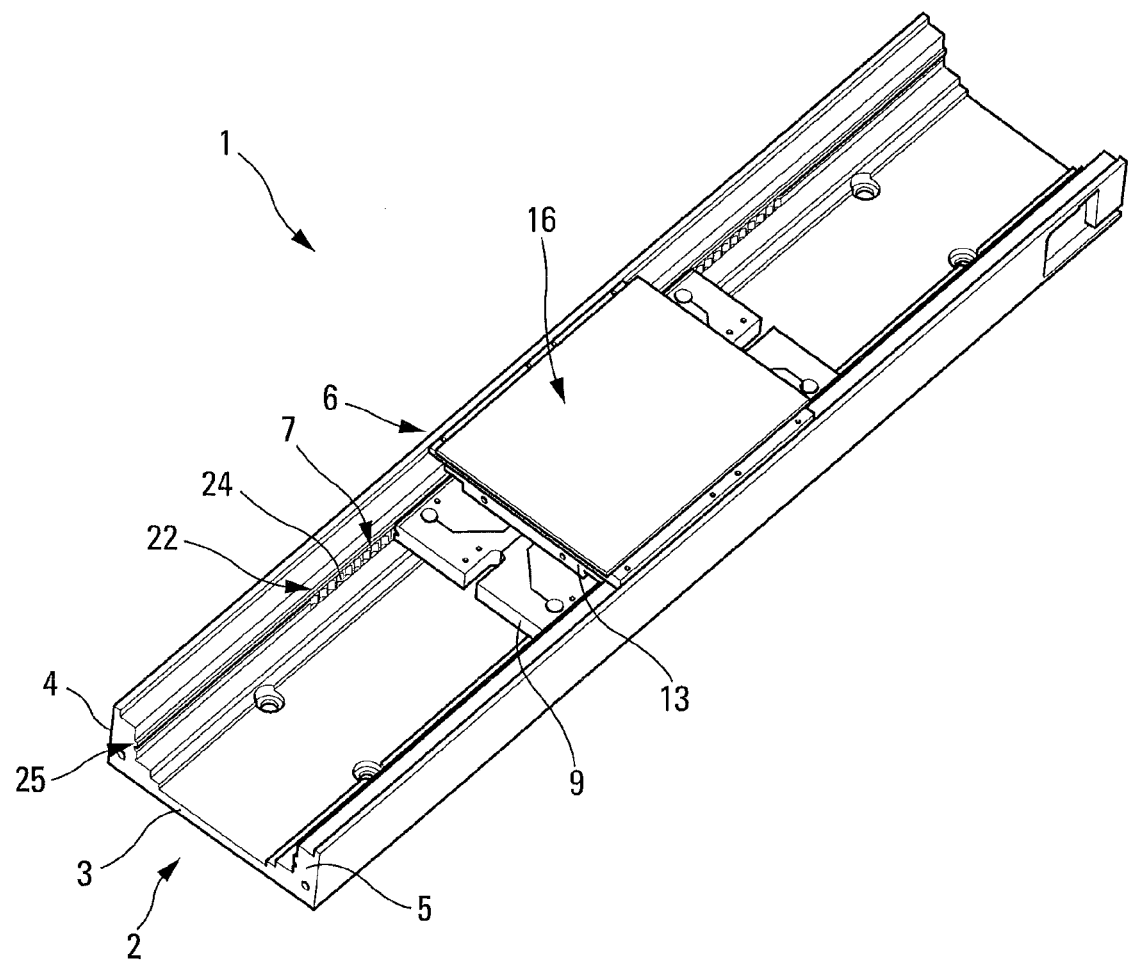
FIG. 3 is a perspective view of an embodiment of a guidance device according to the invention.

Furthermore, in order to allow the carriage 6 to move relative to the bed plate 2, the guidance means 7 comprise V-shaped recesses 20 which are made on either side of the bottom plate 9, on its outer lateral sides 9A and 9B, and which cooperate with appropriate means 21 and 22 provided on the branches 4 and 5 respectively of the bed plate 2. In the embodiment shown in FIG. 1, these cooperating means 21, added or machined, comprise on each side an appropriately shaped guide strip 23. In addition, in the embodiment shown in FIG. 3, these cooperating means 22 comprise, on each side, roller cages 24 which are disposed in appropriate housings (formed from said V-shaped recesses 20 and from V-shaped recesses 25 made in the branches 4 and 5 of the bed plate 2).

In addition, in the embodiment shown in FIG. 2, provided as an illustration, the cuts 10 make it possible to create four portions 26A, 26B, 26C and 26D, namely two laterally external portions 26A and 26B, which are each capable of being fixed via three fixing points 14 to the platform 13 in such a way as to become rigid and which are connected longitudinally, at the front and rear, to two flexible portions 26C and 26D. In this way, a compression stiffness of 1.5 N/µm can be obtained. It is also possible to obtain a pre-loading of 300 N, applied by compression of 0.2 mm (difference in width between the bed plate 2 and the bottom plate 9), as shown by the arrows 27.

It will be noted that the vertical branches 4 and 5 can also be added to the horizontal base 3. It is also possible to fit elements of the guidance means 7 directly to the horizontal base 3 which in this case may not be provided with vertical branches.

The present invention also relates to a method for producing a device 1 for translational guidance as described above.

According to the invention, in order to produce such a guidance device 1, the following successive operations are implemented:

said bed plate 2, said bottom plate 9 and said platform 13 are manufactured in the conventional manner, preferably of hardened steel, each of these elements 2, 9, and 13 being made in a single piece;

through-cuts 10 are made in said bottom plate 9 in the conventional manner, preferably using wire, in accordance with a previously determined design and features in order to give said bottom plate 9 at least some lateral elasticity. All the auxiliary through-cuts 19 envisaged could likewise be made in this bottom plate 9, in particular at the fixing points 14, as well as all the holes 18 envisaged;

this bottom plate 9 is fitted between the branches 4 and 5 of said bed plate 2 using compression made possible by the lateral elasticity produced by the cuts 10 in such a way as to obtain an arrangement under lateral stress. This kind of fitting prevents the body of the bed plate 2 from deforming. In addition, said guidance means 7 are disposed between said bottom plate 9 and said bed plate 2; and said platform 13 is fixed to the upper face 15 of said bottom plate 9, preferably via screws, said platform 13 and said bottom plate 9 in this case forming said carriage 6 of the guidance device 1.

The invention claimed is:

1. Device for translational guidance of a load, said device (1) comprising:

an elongate bed plate (2) with a horizontal base (3); and a movable carriage (6) that serves as a load support and of which at least a portion is disposed under lateral stress on said bed plate (2), wherein said bed plate (2) and said carriage (6) are slidably coupled in order to enable said carriage (6) to move longitudinally relative to said bed plate (2), wherein said carriage (6) comprises:

a bottom plate (9) that is provided with through-cuts (10) intended to give the bottom plate (9) lateral elasticity and which is fitted under lateral stress onto said bed plate (2); and a platform (13) that is fixed to the upper face (15) of said bottom plate (9) at fixing points (14).

2. Device according to claim 1, wherein said bottom plate (9) comprises auxiliary through-cuts (19) at some or all of said fixing points (14).

3. Device according to claim 1, wherein said bottom plate (9) comprises holes (18) at extremities of the through-cuts and auxiliary through-cuts (10, 19).

4. Device according to claim 1, wherein the set of said cuts (10) is formed in such a way as to produce the lateral elasticity with predetermined features.

5. Device according to claim 1, wherein said platform (13) is fixed to said bottom plate (9) via screws.

6. Device according to claim 1, wherein the horizontal base (3) of said bed plate (2) is provided at its two extremities (3A, 3B) with vertical branches (4, 5), and in that said bottom plate (9) is fitted under lateral stress between said vertical branches (4, 5) of the bed plate (2).

7. Device according to claim 6, wherein the outer faces of, respectively, the vertical branches (4, 5) of said bed plate (2), the horizontal base (3) of said bed plate (2), and said bottom plate (9) have, in transverse section, a rectangular shape.

8. Method for producing a device for translational guidance of a load, of the type comprising:

an elongate bed plate (2) with a horizontal base (3); and a movable carriage (6) that serves as a load support and of which at least a portion is disposed under lateral stress on said bed plate (2), wherein said bed plate (2) and said carriage (6) are slidably coupled in order to enable said carriage (6) to move longitudinally relative to said bed plate (2), wherein that at least the following successive operations are implemented:

a) through-cuts (10) are made in a plate (9) described as a bottom plate in order to give the plate (9) lateral elasticity;

b) this bottom plate (9) is fitted to said bed plate (2) using compression made possible by said lateral elasticity in order to obtain an arrangement under lateral stress; and c) a platform (13) is fixed to the upper face (15) of said bottom plate (9), so that said platform (13) and said bottom plate (9) form said carriage (6).

9. Method according to claim 8, wherein at step a) auxiliary through-cuts (19) are additionally made in said bottom plate (9), at fixing points (14).

\* \* \* \* \*